US008849261B2

(12) United States Patent
Cohen

(10) Patent No.: US 8,849,261 B2
(45) Date of Patent: Sep. 30, 2014

(54) PROVISION OF ADDITIONAL CONTENT TO MOBILE COMMUNICATION DEVICES

(76) Inventor: Robert Cohen, Los Angeles, CA (US)

( * ) Notice: Subject to any disclaimer, the term of this patent is extended or adjusted under 35 U.S.C. 154(b) by 630 days.

(21) Appl. No.: 12/402,396

(22) Filed: Mar. 11, 2009

(65) Prior Publication Data

US 2009/0233585 A1  Sep. 17, 2009

Related U.S. Application Data

(60) Provisional application No. 61/035,654, filed on Mar. 11, 2008.

(51) Int. Cl.
| H04L 29/08 | (2006.01) |
| H04M 3/487 | (2006.01) |
| G06Q 30/02 | (2012.01) |
| H04M 3/42 | (2006.01) |

(52) U.S. Cl.
CPC ............ *G06Q 30/02* (2013.01); *H04M 3/4878* (2013.01); *H04M 2207/18* (2013.01); *H04M 3/42382* (2013.01)
USPC ..................... 455/414.4; 455/566; 455/456.1; 455/574; 455/466; 705/14.47; 705/14.61; 709/246

(58) Field of Classification Search
CPC ............... G06Q 30/02; H04M 3/4878; H04M 3/42382; H04M 2207/18
USPC ................. 455/466; 705/14.36, 14.64, 14.54, 705/14.61; 709/217, 246
See application file for complete search history.

(56) References Cited

U.S. PATENT DOCUMENTS

| 5,742,905 A | 4/1998 | Pepe et al. |
| 5,966,652 A | 10/1999 | Coad et al. |
| 6,014,429 A | 1/2000 | LaPorta et al. |
| 6,018,774 A | 1/2000 | Mayle et al. |
| 6,112,090 A | 8/2000 | Valentine |
| 6,408,177 B1 | 6/2002 | Parikh et al. |
| 2001/0011020 A1 | 8/2001 | Nahm |
| 2001/0019951 A1 | 9/2001 | Haumont et al. |
| 2002/0086662 A1 | 7/2002 | Culliss |
| 2004/0024828 A1* | 2/2004 | Miyagi et al. ................. 709/206 |
| 2007/0088851 A1* | 4/2007 | Levkovitz et al. ............ 709/246 |
| 2008/0040227 A1* | 2/2008 | Ostermann et al. ............ 705/14 |
| 2008/0208684 A1* | 8/2008 | Hamilton et al. ............... 705/14 |
| 2008/0221986 A1* | 9/2008 | Soicher et al. .................. 705/14 |
| 2008/0294522 A1* | 11/2008 | Teterin ............................ 705/14 |
| 2009/0132364 A1* | 5/2009 | Agarwal ......................... 705/14 |

FOREIGN PATENT DOCUMENTS

WO    WO 01/37123 A2    5/2001

OTHER PUBLICATIONS

"mBlox launches movile advertising service with SMS insertion pilot", www.gomonews.com, Printed Aug. 4, 2009 (6 pages).
International Search Report from International Searching Authority dated May 25, 2001 for PCT Application No. PCT/US2000/031585.

* cited by examiner

*Primary Examiner* — Shahriar Behnamian
(74) *Attorney, Agent, or Firm* — Klein, O'Neill & Singh, LLP

(57) ABSTRACT

A system and method for the insertion of additional content to messages sent between mobile communications devices. The system provides for a point system which allows users of the system to accumulate points for additional content sent with text messages. The points may be used for various functions such as purchasing premium services or may be applied towards the user's service charges.

15 Claims, 7 Drawing Sheets

US 8,849,261 B2

PROVISION OF ADDITIONAL CONTENT TO MOBILE COMMUNICATION DEVICES

CROSS-REFERENCE TO RELATED APPLICATION(S)

This application claims the benefit of U.S. Provisional Patent Application No. 61/035,654, filed Mar. 11, 2008, the disclosure of which is incorporated by reference herein.

BACKGROUND OF THE INVENTION

The present invention relates generally to communications between mobile communications device and more particularly to text messaging between mobile communications devices.

Individuals remote in location from one another have steadily increasing ways to communicate, often without regard to where those individuals may be. Personal communication devices such as cellular capable telephones, often with sophisticated displays and imaging devices, allow individuals to communicate via voice communications or by non-voice means.

Unfortunately, such communications may be expensive to provide, whether in message transfer costs to individuals, cost of communication devices, or otherwise. For example, usage of text based communications over a cellular network may cause a user to bear significant costs.

In addition, such communications, for example textual communications, may not fully utilize capabilities of communication devices, or of communications systems of which the communications devices form a part.

BRIEF SUMMARY OF THE INVENTION

In one aspect of the invention, the invention provides a method for use in providing additional content to a mobile communication device, comprising: receiving a text message, the text message having been generated by a user of a first mobile communication device inputting text information into a first mobile communications device; selecting an item of additional content out of a plurality of items of additional content; appending the selected item of additional content to the text message; and transmitting the text message and the appended selected item of additional content to a second mobile communication device for display on the second mobile communication device.

In another aspect of the invention, the invention provides a system for transmitting textual information including additional content, comprising: a keypad for entering text information; a processor configured to store information the text information, configured to append additional content including at least additional text to the text information, and configured to command transmission of the text information and additional content to a second mobile communication device; and communication circuitry to transmit the text information and additional content to the second mobile communication device.

In another aspect of the invention, the invention provides a system for transmitting textual information including additional content, comprising: a message service router for routing text information in a cellular communications network; and an additional content server data coupled to the message service router, the additional content server configured to receive at least an indication of a sender of a text message and configured to provide the message service router at least an item of additional content based on at least the indication of a sender of the text message.

These and other aspects of the invention are more fully comprehended upon review of this disclosure.

DETAILED DESCRIPTION

Figure 1:
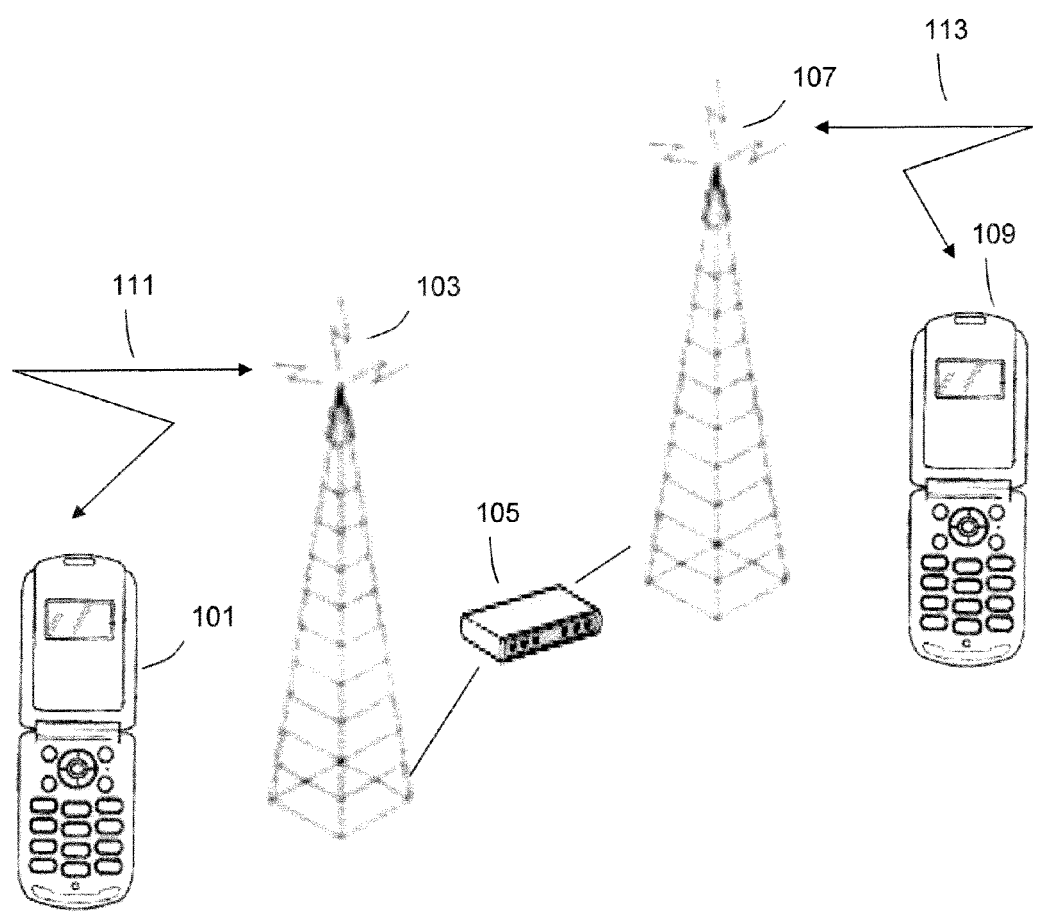
FIG. 1 illustrates an example of a mobile communications device communication system in accordance aspects of the invention.

FIG. 1 is an example of a mobile communications device communications system in accordance with aspects of the invention. The mobile communications device communications system includes a first mobile communications device 101, a first cell site 103, a message service router 105, a second cell site 107, and a second mobile communications device 109. The first mobile communications device may communicate with the second mobile communications device by way of the first cell site, the message service router and the second cell site.

The first mobile communications device includes circuitry to connect to the first cell site through a wireless connection 111. In some embodiments, the wireless connection may utilize a Global System for Mobile communications (GSM) protocol, a Code Division Multiple Access (CDMA) protocol or a Time Division Multiple Access (TDMA) protocol. In many embodiments, the first mobile communications device and the second mobile communications device are cell phones.

The first and second cell sites generally includes a tower or other elevated structure for mounting antennas, and one or more sets of transmitter/receivers transceivers, digital signal processors, and control electronics. The cell sites may also include a GPS receiver for timing and backup electrical power sources. In operation, information from the first mobile communications device is provided to a second communications device by way of the first cell site, the message service router and the second cell site. In addition, in various embodiments, the cell site may not directly communicate with a mobile communications device, with, instead, communications with the mobile communications device being by way of a repeater interposed in a communication path between the cell site and the mobile communications device.

In some embodiments the information from the first mobile communications device includes text information generated by a user of the first mobile communications device, and also includes additional content. The additional content may be, for example, advertisement content stored on the first mobile communications device or downloaded to the device prior to transmission of the text information. In other embodiments, the additional content may be assembled with the text information at a point or points in a communications path between the first mobile communications device and the second mobile communications device.

Figure 2:
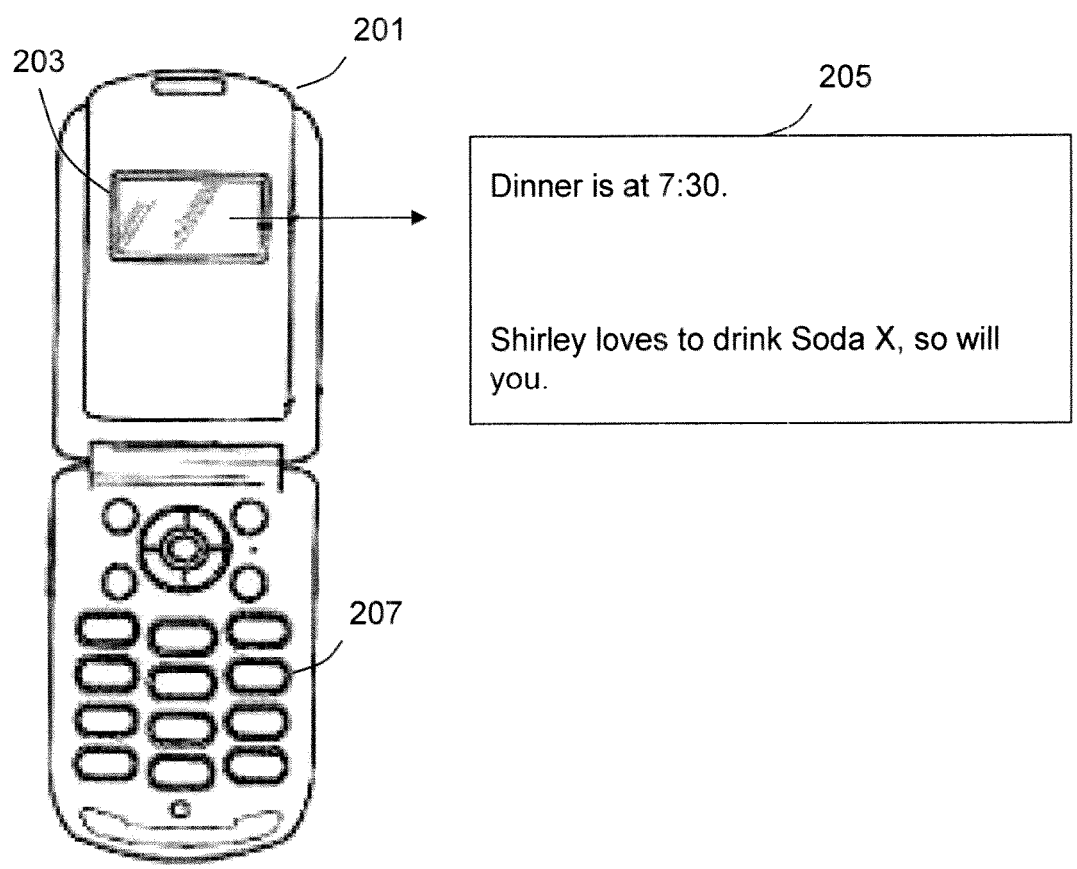
FIG. 2 illustrates an example of a mobile communications device with a received text message and additional content in accordance with aspects of the invention.

FIG. 2 is an example of a mobile communications device and a message 203 in accordance with aspects of the invention. The mobile communications device generally includes a housing 201 which houses communication and related circuitry. In some embodiments, and as illustrated in FIG. 2, the housing includes a keypad 207 for entering information, and a display 203 for displaying information. In some embodiments, the housing may include a touchscreen, which combines the input and display aspects of the device. The display shows a received message 205. The message includes a message sent by another party, with the message type commonly referred to as a text message. As illustrated in FIG. 2, the message states: "Dinner is at 7:30." Appended to the message is additional content. The additional content in FIG. 2 is in the form of advertising content, advertising a "Soda X" brand of soft drink. In addition, the advertising content, which states: "Shirley loves to drink Soda X, so trill you," includes a personalization feature, identifying the sender of the message, namely, Shirley, as endorsing the product advertised by the advertising content.

Figure 3:
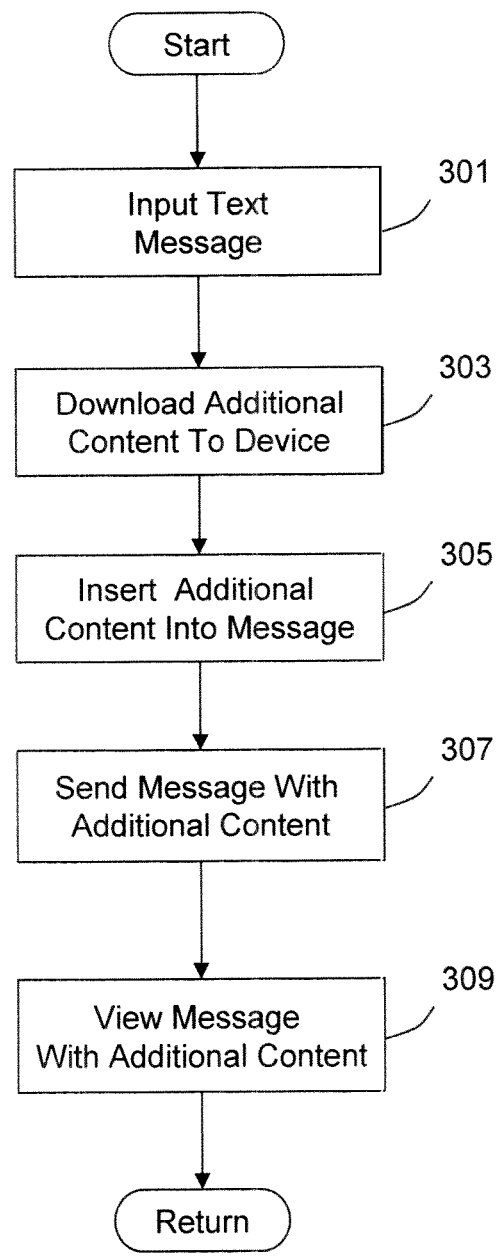
FIG. 3 is a flow diagram of additional content insertion by a mobile communications device in accordance with aspects of the invention.

FIG. 3 is a flow diagram of mobile communications device messaging system in accordance with aspects of the invention. In block 301 the process receives a text message input by a user into a mobile communications device. In many embodiments, the mobile communications device is a cell phone. In many embodiments, the text message, when transmitted, conforms to the Short Message Service (SMS) communications standard. In some embodiments, the text message comprises text only. In some embodiments, the text message comprises pictures and/or graphics. In some embodiments, the text message comprises a combination of text and pictures and/or graphics. In many embodiments, the sender may input a text message by using a keypad or a touchscreen of the mobile communications device. In some embodiments, the user may select from a plurality of standard and saved messages. For example, the user may select a previously saved message to from a list of saved messages.

In block 303, the process downloads additional content to the user's mobile communications device. For example in some embodiments, the mobile communications device is configured to request additional content from a service provider prior to sending a text message, and to receive the additional content from the service provider. In some embodiments, however, the additional content is already resident in memory of the mobile communications device. In many embodiments, the additional content may be in the form of advertising content. In some embodiments, the additional content may be in the form of announcements or news information. In some embodiments, the additional content comprises text. In some embodiments, the additional content comprises pictures and/or graphics. In some embodiments, the additional content comprises a combination of text and pictures and/or graphics. In some embodiments, additional content or a plurality of additional content are downloaded to the users mobile communications device upon the user entering a text message. In some embodiments, additional content may be downloaded to the sender's mobile communications device at various times. For example, and in some embodiments, an item of additional content or a plurality of items of additional content may be downloaded to the user's mobile communications device upon powering on the mobile communications device and connecting to a communications network. In some embodiments, the item of additional content or a plurality items of additional content may be downloaded to the user's phone at a time during which the user's phone is not in use by the user. In some embodiments an item of additional content or a plurality of items of additional content may be downloaded to the sender's phone at scheduled intervals, for example, every 2 hours. In some embodiments, the user may configure the time and intervals at which additional content will be downloaded to the mobile communications device.

In block 305, the process inserts additional content into the user's text message. In many embodiments, the additional content is inserted to a portion of the text message where the additional content does not obscure the user's message. For example, the additional content may be appended at the end of the message. In some embodiments, the additional content may be plain text. In some embodiments the additional content may be animated text and/or graphics. For example, the additional content may scroll along a bottom portion of the text message. In some embodiments, the sender may determine where the additional content is placed. In some embodiments, the mobile communications device automatically determines where the additional content is to be placed. For example, the mobile communications device may determine an optimal placement for the additional content based on the number of characters or size of a picture or graphic in the additional content.

In block 307, the process sends the text message from the user's mobile communications device with the additional content. In some embodiments, the user created text message and the attached additional content may be sent in a single transmission. In some embodiments, the user created message and additional content may be sent as separate transmissions. For example, the user created message may be sent first, followed by the additional content.

In many embodiments and as discussed in FIG. 1, the text message is sent from the user's mobile communications device to a cell site. From the cell site, the message is sent to a message service router. In many embodiments, the message service router is a Short Message Service Center (SMSC). The message service router determines an appropriate destination for the text message and transmits the text message to a destination mobile communication device through a cell site. In many embodiments, the message service router will determine the status of a destination mobile communications device before sending the text message. If the message service router determines that the destination mobile communications device is available, the message service router will immediately send the message to the destination mobile communications device through a cell site. However, if the message service router determines that the destination mobile communications device is unavailable, the message service router will store the text message in a database or queue and send the message when the destination mobile communications device becomes available. In some embodiments, the message service router may periodically check the status of the destination mobile communications device until the destination mobile communications device becomes available. For example, the message service router may check the status of the destination mobile communications device every 10 minutes to determine if it has become available. In some embodiments, once the destination mobile communications device becomes, the destination mobile communications device will send a notification to the message service router notifying it of its availability. When the message service router has determined that the destination mobile communications device has become available, the message service router will send the text message to the destination mobile communications device through a cell site.

In block 309, the text message with additional content is received by the destination mobile communications device. In many embodiments, when a mobile communications device receives a text message, device may produce an alert informing the user of the text message. For example, the mobile communications device may produce a sound effect or vibrate. As illustrated in FIG. 27 when the user views the received text message the text message will include the user created message and the additional content. In many embodiments, the additional content will be at the end of the text message, although in some embodiments, the additional content may be placed at a location as determined by the sender. In many embodiments, the additional content may be in the form of a link and the user may click on the link to view additional details corresponding to the additional content. For example, the additional content may be a link to an advertisement by Vendor A. The user may click the link to the advertisement and view additional details about the advertisement. In some embodiments, for example in some embodiments where the mobile communications device has a capability to view Internet websites, the link may be a link to the advertiser's Internet website.

Figure 4:
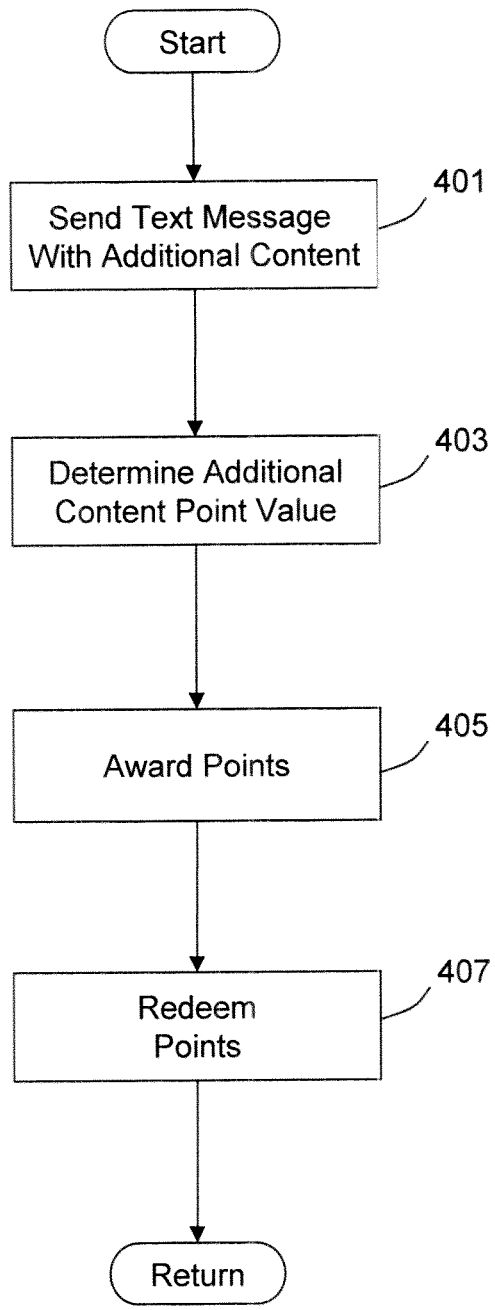
FIG. 4 is a flow diagram of a points system for additional content in accordance with aspects of the invention.

FIG. 4 is a flow diagram of a points system for an additional content service in accordance with aspects of the invention. In block 401, a mobile communications device user sends a message with an additional content to another mobile communications device user. In some embodiments, the user created text message and the attached additional content may be sent in a single transmission. In some embodiments, the user created message and additional content may be sent as separate transmissions. For example, the user created message may be sent first, followed by the additional content. In many embodiments and as illustrated in FIG. 1, the message will be sent through a cell site and to a message service router. In many embodiments, the message service router will be a Short Message Service Center (SMSC). The message service router will determine the destination mobile communications device for the message.

In block 403, the message service router or other component, determines a point value for additional content sent by a user. In many embodiments, additional content may be in the form of advertising content. In many embodiments, items of additional content may be worth varying point values. The message service router has access to a database of additional content and associated point values. In some embodiments, point values for additional content may be related to the size of the additional content. For example, an item of additional content with a greater number of text characters may be assigned a higher point value than an item of additional content with fewer text characters. In many embodiments, additional content which are deemed to be of higher priority may be assigned a higher point value than additional content deemed to be of lower priority. For example, a vendor may seek to increase circulation of its advertisements and may pay a communications service provider a premium price to assign a higher point value to additional content corresponding to the vendor's advertisements. In some embodiments, and to facilitate circulation of a vendor's advertisements, users of the additional content service may be notified of any advertisements that are assigned an increased point value. Users seeking to earn more points may be more likely to select additional content of higher point values. In some embodiments, some additional content may be assigned increased point values during selected periods of time. For example, any additional content relating to a selected television show may be assigned double the standard point values during week leading up to television show and triple the standard point values on the day of the television show.

In block 405, the message service router or other component awards points to the user responsible for sending the additional content. In some embodiments, points may also be awarded to the user receiving the additional content. In many embodiments, the message service router has access to a user database which stores user information, including the number of additional content points accumulated by a user. In some embodiments the message service router awards points after a destination mobile communications device has received a text message with the additional content. For example, if the destination mobile communications device is available and the message service router is able to send the text message with additional content to the destination mobile communications device, the sending user is awarded points. However, if the destination mobile communications device is unavailable, points may not be awarded until the destination mobile communications device becomes available and the message service router is able to confirm receipt of the text message with attached additional content. For example, if the destination mobile communications device is turned off, the message service router may not be able to send the text message with additional content. In some embodiments, the system awards points immediately after the sender sends the text message with the additional content, regardless of whether the destination mobile communications device is available.

In some embodiments, and in embodiments where the additional content may be in the form on a link, the user may click the link to view additional details about the additional content. In some embodiments, points may be awarded to the sender after the receiver has clicked the link and viewed the additional details. In some embodiments, no points may be awarded to the sender if the receiver does not click the link contained in the additional content.

In many embodiments, the message service router or other component may record the number of times a user has sent additional content to another user in a database. In some embodiments and in order to encourage spreading additional content to many different users, the message service router may set a limit on the number points a user may accumulate by sending additional content to the same user within a given time period. For example, a user may be limited to sending a maximum of five items of additional content to the same user within a 24 hour period. If a user has already sent five items of additional content to the same user within a 24 hour period, the message service router may not award points for any additional items of additional content sent to the same user. In some embodiments, the message service router may award points even after the user has reached the limit, however the message service router may reduce the number of points awarded by a scalar value. For example, the message service router may award one half of the full value of the item of additional content once a user has reached the maximum limit. In some embodiments, a user may be limited in the number of points they can accumulate by sending additional content to any single user within a given time period. For example, in some embodiments, a user may not earn more than 20 points per day by sending any number of items of additional content to the same user.

In some embodiments the message service router or other component may record the number of times a user has sent a specific item of additional content. In some embodiments, and in order to prevent a specific item of additional content from becoming overcirculated, the message service router may set a limit to the number of points a user may accumulate by sending the same item of additional content. For example, a user may be limited to sending the same item of additional content to no more than five times within a 24 hour period. If the user has already sent the same item of additional content five times within a 24 hour period, the message service router may not award any additional points for any further use of the same item of additional content for that 24 hour period.

In block 407, the user redeems accumulated points. In some embodiments, a user may be required to first reach a minimum number of points in order to redeem any accumulated points. In some embodiments, a user may redeem points immediately. In some embodiments, a user may redeem points in predetermined multiples. For example, a user may redeem points in multiples of 10. In some embodiments, points may be used to purchase premium services and features from the user's service provider. For example, points may be used to purchase ring tones and/or custom wallpaper and graphics for use with the user's mobile communications device. In some embodiments, additional content points may be used towards payment of service provider charges. In some embodiments, the additional content points may be exchanged for cash at a predetermined exchange rate.

Figure 5:
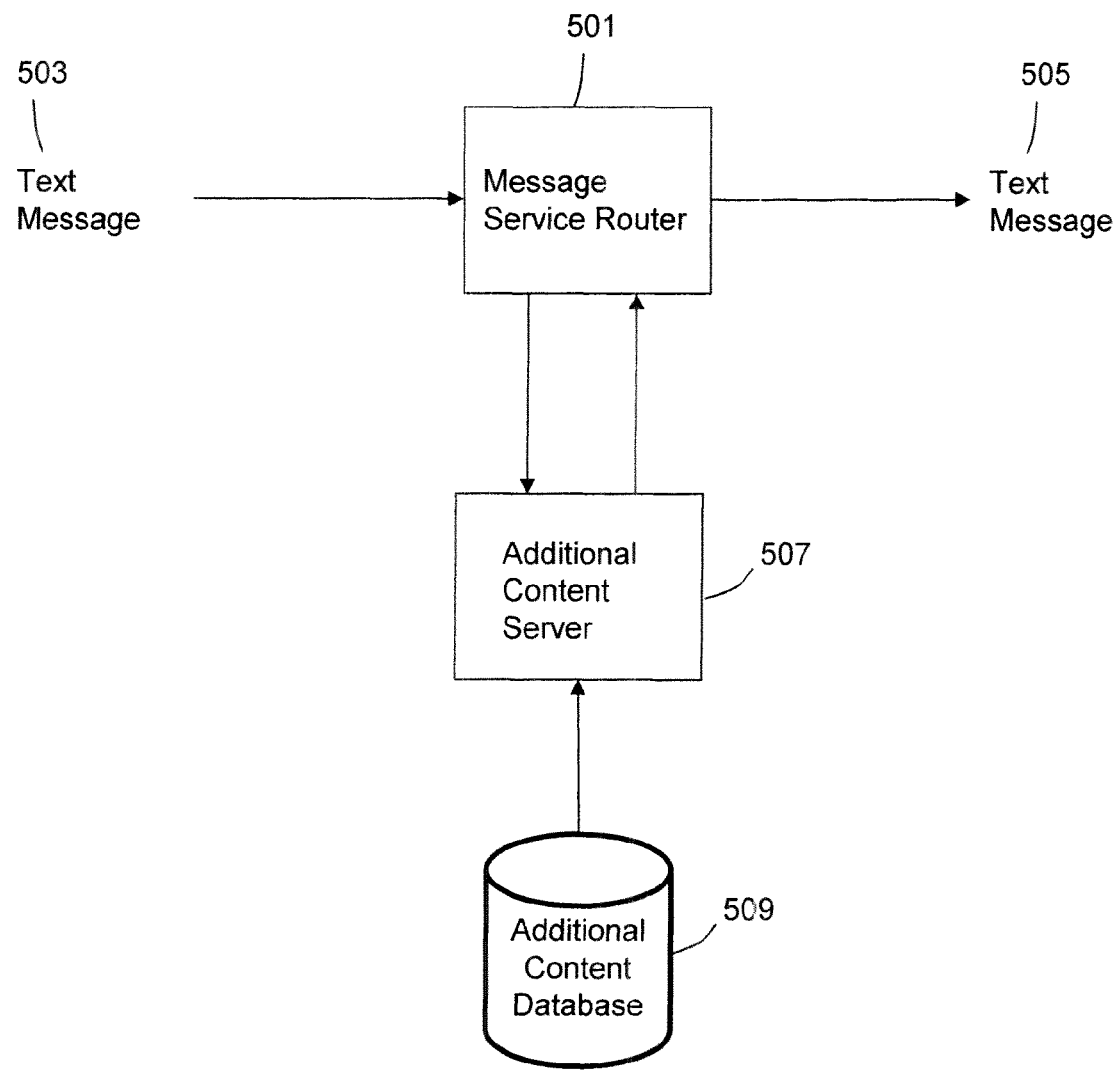
FIG. 5 is a block diagram of additional content insertion by a message service router in accordance with aspects of the invention.

FIG. 5 is a block diagram of additional content insertion by a message service router 501 in accordance with aspects of the invention. A message service router receives text messages 503 from mobile communications devices through cell sites. In many embodiments the text message conforms to the Short Message Service (SMS) communications standard. In some embodiments, the message service router may be a Short Message Service Center (SMSC).

The message service router determines a destination for each received text message. The message service router also selects additional content to append to each received message. The message service router selects additional content by querying an additional content server 507. The additional content server queries an additional content database 509. In some embodiments, a user enrolled in an additional content service may select additional content that the user would like to use. For example, from a set of 26 items of additional content. Additional Content A to Additional Content Z. User 1 may select Additional Content B. When the message service router queries the additional content server for additional content for User 1, the additional content server queries the additional content database and returns Additional Content B to the additional content server. The additional content server returns the same to the message service router. In some embodiments, the user may select a plurality of additional content.

In many embodiments, the additional content may be in the form of advertising content. In many embodiments, each item of additional content may be assigned a point value. The additional content server provides the message service router with the point value associated with the additional content. The message service router awards the points to the sender of the text message. In some embodiments, the awarded points may be stored on the sender's mobile communications device. In other embodiments, the awarded points may be stored in a user database. The message service router appends the additional content to the text message. The message service router sends the text message 505 to its destination through a cell site. In many embodiments, the destination will be a mobile communications device, for example a cell phone.

Figure 6:
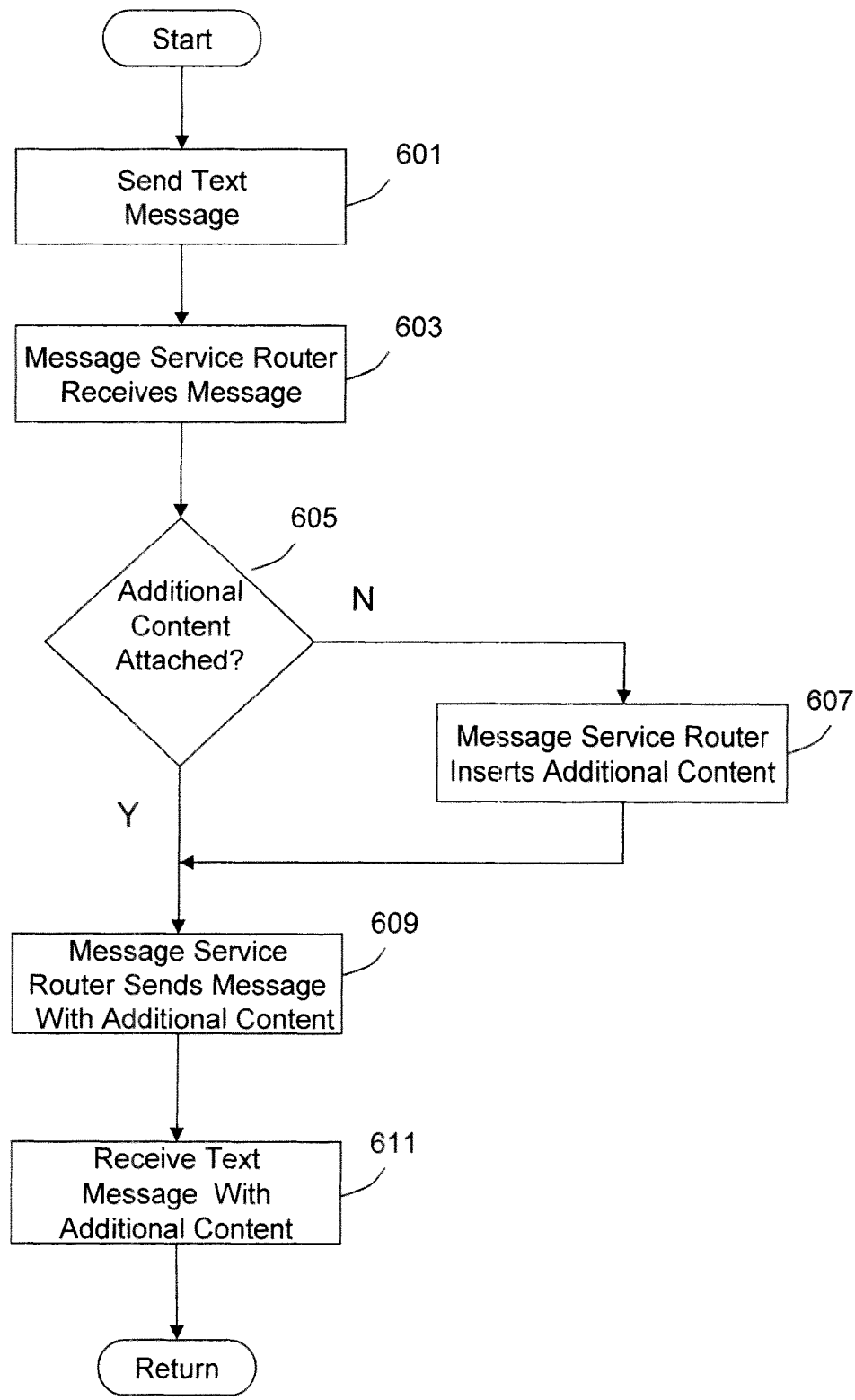
FIG. 6 is a flow diagram of additional content insertion by a message service router in accordance with aspects of the invention.

FIG. 6 is a flow diagram of additional content insertion by a message service router or other component in accordance with aspects of the invention. In block 601, the process sends a text message from the user's mobile communications device with the additional content. In many embodiments, the mobile communications device is a cell phone. In many embodiments, the text message, when transmitted, conforms to the Short Message Service (SMS) communications standard. In some embodiments, the text message comprises text only. In some embodiments, the text message comprises pictures and/or graphics. In some embodiments, the text message comprises a combination of text and pictures and/or graphics. In many embodiments, the sender may input a text message by using a keypad or a touchscreen of the mobile communications device.

In some embodiments, the user created text message and the attached additional content may be sent in a single transmission. In some embodiments, the user created message and additional content may be sent as separate transmissions. For example, the user created message may be sent first, followed by the additional content. In many embodiments and as discussed in FIG. 1, the text message is sent from the user's mobile communications device to a cell site. From the cell site, the message is sent to a message service router.

In block 603, the message service router or other component receives the text message. In many embodiments, the message service router is a Short Message Service Center (SMSC). In many embodiments and as illustrated in FIG. 1, the message service router is connected to a plurality of cell sites. The user's mobile communications device sends a text message by connecting to a cell site. The text message is sent through a cell site and transmitted to the message service router. In some embodiments, the message service router is a Short Message Service Center (SMSC).

In block 605, the process determines whether the text message contains additional content. In some embodiments, additional content may have been added by a user. For example, additional content may have been downloaded to the mobile communications device and sent with the text message as discussed in FIG. 3. In some embodiments, no additional may have been added and the text message In some embodiments, the additional content comprises text only. In some embodiments, the additional content comprises pictures and/or graphics. In some embodiments, the additional content comprises a combination of text and pictures and/or graphics. In other embodiments, the user may have sent a text message which does not contain additional content. If the text message does not contain additional content, the process proceeds to block 607. Otherwise, the process proceeds to block 609.

In block 607, the message service router or other component inserts additional content to the text message. In many embodiments, the additional content is inserted to a portion of the text message where the additional content does not obscure the user's message. For example, the additional content may be appended at the end of the message. In some embodiments, the additional content may be plain text. In some embodiments the additional content may be animated text and/or graphics. For example, the additional content may scroll along a bottom portion of the text message. In some embodiments, the sender may determine where the additional content is placed. In some embodiments, the mobile communications device automatically determines where the additional content is to be placed. For example, the mobile communications device may determine an optimal placement for the additional content based on the number of characters or size of a picture or graphic in the additional content.

In block 609, the message service router sends the text message with additional content. In some embodiments, the user created text message and the attached additional content may be sent in a single transmission. In some embodiments, the user created text message and additional content may be sent as separate transmissions. For example, the user created text message may be sent first, followed by the additional content. In many embodiments and as illustrated in FIG. 1, the message will be sent from the message service router, through a cell site to a destination mobile communications device.

In block 611, the text message with additional content is received by the destination mobile communications device. In many embodiments, when a mobile communications device receives a text message, device may produce an alert informing the user of the text message. For example, the mobile communications device may produce a sound effect or vibrate. As illustrated in FIG. 2, when the user views the received text message, the text message will include the user created message and the additional content. In many embodiments, the additional content will be at the end of the text message, although in some embodiments, the additional content may be placed at a location as determined by the sender.

Figure 7:
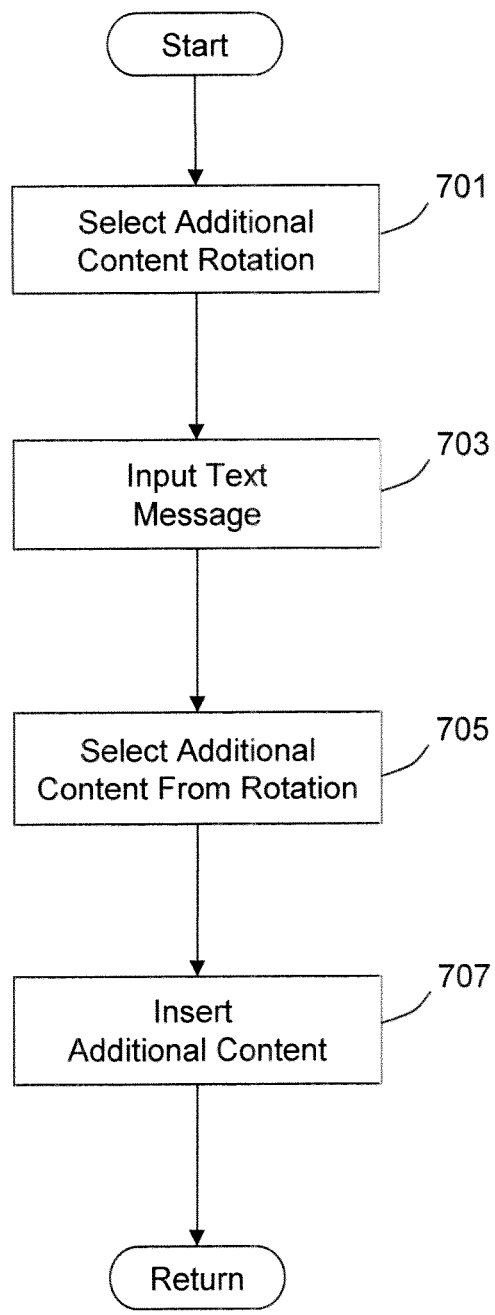
FIG. 7 is a flow diagram of an additional content selection process in accordance with aspects of the invention.

FIG. 7 is a flow diagram of additional content selection in accordance with aspects of the invention. In block 701, the process selects a plurality of items of additional content from a set of items of additional content available to the user. The plurality of items of additional content may be referred to as the user's additional content rotation. In many embodiments, additional content the process may automatically select items of additional content.

In some embodiments, the process may prompt a user who has enrolled in an additional content service to select a number of items of additional content to be used with text messages. In some embodiments, items of additional content may be selected from the user's mobile communications device. In many embodiments, the mobile communications device may be in the form of a cell phone. For example, a text message may be received by the user's cell phone from the service provider prompting the selection a number of items of additional content for use with text messages. The text message may have a list of items of additional content and the user may select items of additional content by responding to the text message with selections.

In some embodiments additional content may be selected through an Internet web server. For example, the service provider may provide an Internet web server which allows the user to log in and select items of additional content for use with the user's text messages.

In many embodiments, the selected items of additional content may be stored in a database or a database-like storage component. In some embodiments, the database or database-like storage component may be a component of the mobile communications device. In some embodiments, the database or a database-like storage component may be a component of a message service router. The database or a database-like storage component may contain items of additional content or references to items of additional content and associations or references to users.

In block 703, the process inputs a message into a user's mobile communications device to be sent to another user's mobile communications device. In many embodiments, the text message, when transmitted, conforms to the Short Message Service (SMS) communications standard. In some embodiments, the text message comprises text only. In some embodiments, the text message comprises pictures and/or graphics. In some embodiments, the text message comprises a combination of text and pictures and/or graphics. In many embodiments, a keypad or touchscreen of the mobile communications device may be used to input a text message. In some embodiments, a plurality of standardized and saved text messages may be selected by the user, for example, a previously sent text message.

In block 705, an item of additional content is selected from the user's additional content rotation selected in block 701. In some embodiments, one item of additional content may be selected. In some embodiments, a plurality of items of additional content may be selected. In many embodiments, the process may select an item or items of additional content based on the content of the text message. The process may parse the text message for preprogrammed phrases or words and select additional content based on the preprogrammed phrases or words. For example, the text message may contain the word "restaurant" and the process may select an item of additional content relating to food and restaurants. For example the text message may contain the message: "Let's meet at the restaurant for dinner." The process may select an item of additional content relating to restaurants, for example an advertisement by Restaurant A, stating: "Steve likes eating fast food at Restaurant A." In some embodiments, the item or items of additional content may be selected by the user. In some embodiments, the mobile communications device may select the item additional content. In some embodiments, the message service router may select the item of additional content.

In block 707, the item or items of additional content are inserted into a text message. In many embodiments, the additional content is inserted to a portion of the text message where the additional content does not obscure the user's message. For example, the additional content may be appended at the end of the message. In some embodiments, the additional content may be plain text. In some embodiments the additional content may be animated text and/or graphics. For example, the additional content may scroll along a bottom portion of the text message. In some embodiments, the sender may determine where the additional content is placed. In some embodiments, the mobile communications device automatically determines where the additional content is to be placed. For example, the mobile communications device may determine an optimal placement for the additional content based on the number of characters or size of a picture or graphic in the additional content.

Accordingly, aspects of the invention provide additional content for text messaging related systems and methods. Although the invention has been discussed with respect to various embodiments, it should be recognized that the invention comprises the novel and non-obvious claims supported by this disclosure.

The invention claimed is:

1. A method for use in providing advertisement content to a mobile communication device, comprising:
   receiving a text message by a first mobile communication device, by way of a user of the first mobile communication device inputting text information into the first mobile communication device;
   parsing the text message for preprogrammed words;
   selecting, by the first mobile communication device, an item of advertisement content out of a plurality of items of advertisement content for appending to the text message based on the preprogrammed words;
   appending the selected item of advertisement content to the text message;
   transmitting the text message and the appended selected item of advertisement content to a second mobile communication device for display on the second mobile communication device; and associating a point value with the user of the first mobile communication device based on transmission of the text message and the appended selected item of advertisement content to the second mobile communication device;

wherein at least some of the different items of the plurality items of advertisement content have different associated point values.

2. The method of claim 1 wherein the first mobile communications device performs selection of an additional item of advertisement content out of the plurality of items of advertisement content based on a user selection of the item of advertisement content.

3. The method of claim 1 wherein the plurality of items of advertisement content are stored on the first mobile communications device.

4. The method of claim 1, further comprising downloading, by the first mobile communication device, of the plurality of items of advertisement content.

5. The method of claim 1 wherein the text message and appended selected item of advertisement content are transmitted to the second mobile communications device by way of a cellular communication system.

6. The method of claim 1 wherein the point value has a monetary value.

7. The method of claim 1 wherein the point value is redeemable for goods or services.

8. A system for transmitting textual information including additional content, comprising:

a keypad for entering text information;

a processor configured to store information of the text information, configured to append advertisement content, including at least additional text identifying a sender of the text information as endorsing a product advertised by the advertisement content, to the text information, and configured to command transmission of the text information and the advertisement content, including the additional text identifying the sender of the text information as endorsing the product advertised by the advertisement content, to a second mobile communication device, and wherein the processor is further configured to allow selection by the sender of the advertisement content from a plurality of items of advertisement content, at least some of the different items of the plurality of items of advertisement content having different associated point values, and to parse the text information for preprogrammed words and to select the advertisement content based on the preprogrammed words; and communication circuitry to transmit the text information and the advertising content, including the additional text identifying the sender of the text information as endorsing the product advertised by the advertisement content, to the second mobile communication device.

9. The system of claim 8 wherein transmission of the text information and advertisement content to the second mobile communication device is by way of a cellular network.

10. The system of claim 8 wherein the processor is further configured to command display of a point value associated with the advertisement content.

11. The system of claim 8 wherein the processor is further configured to command transmission of a request to download further items of advertisement content for selection by the sender.

12. A method for use in providing advertisement content to a mobile communication device, comprising:

receiving a text message, the text message having been generated by a user of a first mobile communication device inputting text information into a first mobile communications device;

parsing the text message for preprogrammed words and selecting an item of advertisement content out of a plurality of items of advertisement content based on the preprogrammed words;

appending the selected item of advertisement content to the text message;

transmitting the text message and the appended selected item of advertisement content to a second mobile communication device for display on the second mobile communication device; and associating a point value with the user of the first mobile communication device based on transmission of the text message and the appended selected item of advertisement content to the second mobile communication device;

wherein at least some of the different items of the plurality items of advertisement content have different associated point values.

13. The method of claim 12 wherein a message service router of a service provider receives the text message, and the service provider performs selection of the item of advertisement content out of the plurality of items of advertisement content.

14. The method of claim 12 wherein the text message and appended selected item of advertisement content are transmitted to the second mobile communications device by way of a cellular communication system.

15. The method of claim 12 further comprising associating a point value with the user of the first mobile communication device based on transmission of the text message and the appended selected item of advertisement content to the second mobile communication device.

* * * * *

UNITED STATES PATENT AND TRADEMARK OFFICE
CERTIFICATE OF CORRECTION

PATENT NO. : 8,849,261 B2  
APPLICATION NO. : 12/402396  
DATED : September 30, 2014  
INVENTOR(S) : Cohen Page 1 of 1

It is certified that error appears in the above-identified patent and that said Letters Patent is hereby corrected as shown below:

In the Specification

Column 3, line 24, delete "trill" and insert --will--, therefor.

Column 3, line 62, delete "users" and insert --user's--, therefor.

Column 5, line 10, delete "27" and insert --2,--, therefor.

Signed and Sealed this
Thirtieth Day of June, 2015

Michelle K. Lee
*Director of the United States Patent and Trademark Office*